United States Patent [19]
Maeda

[11] Patent Number: 6,016,621
[45] Date of Patent: *Jan. 25, 2000

[54] FISHING ROD

[76] Inventor: Masashi Maeda, 38-10, Kichijojihigashi-cho 2-chome, Musashino-shi, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,199

[22] Filed: Oct. 8, 1997

[51] Int. Cl.⁷ .......................... A01K 87/00; A01K 87/04
[52] U.S. Cl. ................................ 43/18.1; 43/24
[58] Field of Search ....................... 43/18.1, 24

[56] References Cited

U.S. PATENT DOCUMENTS

| | | | |
|---|---|---|---|
| 1,748,354 | 2/1930 | Laing | 43/18.1 |
| 1,755,159 | 4/1930 | Cowdery et al. | 43/18.1 |
| 1,843,714 | 2/1932 | Fuller | 43/18.1 |
| 2,324,429 | 7/1943 | Rondelli | 43/18.1 |
| 2,365,414 | 12/1944 | Kruse | 43/18.1 |
| 2,680,923 | 6/1954 | Hyland | 43/18.1 |
| 2,776,516 | 1/1957 | Jennette | 43/24 |
| 2,880,546 | 4/1959 | Pemberton | 43/24 |
| 2,893,158 | 7/1959 | Haber | 43/24 |
| 3,102,358 | 9/1963 | Steinle | 43/24 |
| 3,222,811 | 12/1965 | Henson | 43/18.1 |
| 3,279,116 | 10/1966 | Chapman | 43/24 |
| 3,421,248 | 1/1969 | Kennedy | 43/24 |
| 3,608,226 | 9/1971 | Stanley | 43/24 |
| 4,020,581 | 5/1977 | Genovese | 43/24 |
| 4,027,419 | 6/1977 | Popeil | 43/18.1 |
| 4,060,924 | 12/1977 | Cunningham | 43/24 |
| 4,084,343 | 4/1978 | Genovese | 43/24 |
| 4,130,960 | 12/1978 | Fontenot | 43/18.1 |
| 4,209,931 | 7/1980 | Vance | 43/24 |
| 4,428,140 | 1/1984 | Yamamoto | 43/24 |
| 4,860,482 | 8/1989 | Yamato | 43/18.1 |
| 4,996,789 | 3/1991 | Hoover | 43/24 |
| 5,802,759 | 9/1998 | Ohmura | 43/24 |

FOREIGN PATENT DOCUMENTS

| | | | |
|---|---|---|---|
| 484132 | 6/1952 | Canada | 43/24 |
| 588764 | 12/1959 | Canada | 43/24 |
| 2646991 | 11/1990 | France | 43/24 |
| 6-303878 | 11/1994 | Japan . | |
| 20609 | 9/1902 | United Kingdom | 43/24 |
| 1132624 | 11/1968 | United Kingdom | 43/24 |
| 1132625 | 11/1968 | United Kingdom | 43/24 |
| WO 94/16558 | 8/1994 | WIPO | 43/18.1 |

OTHER PUBLICATIONS

Popular Mechanics, "Upside Down Rod", Jun. 1948.

*Primary Examiner*—Michael J. Carone
*Assistant Examiner*—Darren Ark
*Attorney, Agent, or Firm*—Browdy and Neimark

[57] ABSTRACT

A fishing rod comprising: a grip handle 2 provided with a reel pedestal fixing device 1, and a fishing rod member 3 having two or more fishing-line-guiding rings 5 fixedly secured to the lower surface thereof. The fishing rod member 3 is connected with and fixedly secured to the leading end of the grip handle 2. The fishing-line-guiding ring 5' located nearest to the grip handle 2 out of said fishing-line-guiding rings 5 is inclined to the side of the grip handle relative to the direction at right angles to the lengthwise direction of the fishing rod member.

7 Claims, 5 Drawing Sheets

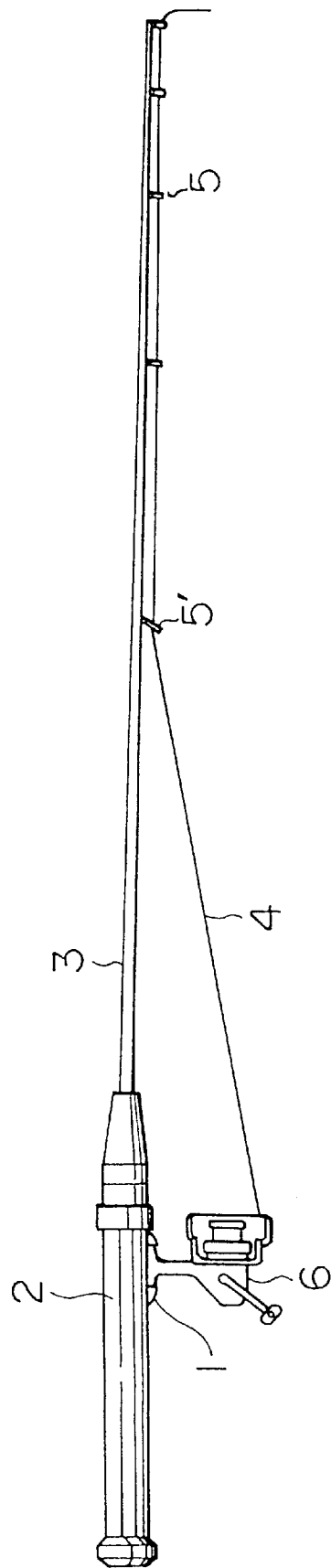

FISHING ROD

BACKGROUND OF THE INVENTION

1. Field of the Invention

This invention relates to a fishing rod which is convenient for storage, transportation and easiness for practical use.

2. Description of the Prior Art

It is most important when fishing to sensitively detect a strike transmitted on a fishing line. Most of the latest fishing rods use manually operated or motor-driven reels, and in most cases of such fishing rods, the reel is provided above the fishing rod from the point of view of easiness for operation of the reel and adjustments for playing out of the fishing line. The fishing line is normally played to be sent out through the fishing-line-guiding rings fixedly secured to the upper surface of the fishing rod to the leading end of the latter.

In the fishing rods of such a construction, in most cases, the fishing line is liable to contact with the fishing rod, and the contact resistance of the fishing rod renders it difficult for a fisherman to sensitively detect a delicate strike transmitted on the fishing line.

For this reason, as disclosed in Japanese Laid-Open Patent Application No. HEI 6-303878, there was proposed a fishing rod arranged such that a fishing-line-passing hole is provided in the intermediate portion of the fishing rod to prevent the fishing line from contacting the fishing rod, and the fishing line is guided from the reel near the user's hand and through the fishing-line-passing hole and also through a fishing-line-guiding ring amounted on the lower surface of the leading end of the fishing rod.

However, in the case of the fishing rod disclosed in said Japanese Laid-Open Patent Application No. HEI 6-303878, the fishing line still contacts an edge of the fishing-line-passing hole, and therefore, a strike cannot reach directly the user's hand holding the grip handle, i.e, it is difficult to sensitively detect a delicate strike.

SUMMARY OF THE INVENTION

The present invention has for its object to settle the problems in the above-mentioned heretofore known techniques and provide a fishing rod whereby it is possible to sensitively detect a delicate strike using the reel, and which is convenient for storage, transportation and easiness for practical use, and which is particularly suitable for fishing on board a ship.

To achieve the above-mentioned object, according to a first aspect of the present invention, there is provided a fishing rod comprising: a grip handle provided with a reel pedestal fixing device, and a fishing rod member having two or more fishing-line-guiding rings fixedly secured to the lower surface thereof, the fishing rod member being connected with and fixedly secured to the leading end of the grip handle, wherein the fishing-line-guiding ring located nearest to the grip handle out of said fishing-line-guiding rings is inclined to the side of the grip handle with respect to the direction at right angles to the lengthwise direction of the fishing rod member.

To achieve the above-mentioned object, according to a second aspect of the present invention, there is provided a fishing rod comprising: a grip handle provided with a reel pedestal fixing device on the upper side thereof, and a fishing rod member having two or more fishing-line-guiding rings fixedly secured to the lower surface thereof, the fishing rod member being connected with and fixedly secured to the leading end of the grip handle, wherein an intermediary axially central portion of the fishing rod is formed with a space through which the fishing line can be moved freely in response to the deflection of the fishing rod without the contact of the fishing line with the fishing rod member, and the fishing-line-guiding ring located nearest to the grip handle out of said fishing-line-guiding rings is inclined to the side of the grip handle with respect to the direction at right angles to the lengthwise direction of the fishing rod member.

To achieve the above-mentioned object, according to a third aspect of the present invention, there is provided a fishing rod according to said first aspect, wherein the fishing-line-guiding ring located nearest to the grip handle out of said fishing-line-guiding rings has an elliptical fishing-line-passing hole.

To achieve the above-mentioned object, according to a fourth aspect of the present invention, there is provided a fishing rod according to said second aspect, wherein the fishing-line-guiding ring located nearest to the grip handle out of said fishing-line-guiding rings has a rectangular fishing-line-passing hole.

To achieve the above-mentioned object, according to a fifth aspect of the present invention, there is provided a fishing rod according to said third aspect, wherein the longer side of a rectangle or the major axis of an ellipse of the fishing-line-guiding ring located nearest to the grip handle out of said fishing-line-guiding rings is inclined to the side of the grip handle with respect to the direction at right angles to the lengthwise direction of the fishing rod member, and said fishing-line-guiding ring has a rectangular or elliptical fishing-line-passing hole having a longitudinal axis inclined to the axis of the fishing rod member.

Further, to achieve the above-mentioned object, according to a sixth aspect of the present invention, there is provided a fishing rod according to said fourth aspect, wherein the longer side of a rectangle of the fishing-line-guiding ring located nearest to the grip handle out of said fishing-line-guiding rings is inclined to the side of the grip handle with respect to the direction at right angles to the lengthwise direction of the fishing rod member, and said fishing-line-guiding ring has a rectangular fishing-line-passing hole.

The above-mentioned and other objects, aspects and advantages of the present invention will become apparent to those skilled in the art by making reference to the following description and the accompanying drawings in which preferred embodiments incorporating the principles of the present invention are shown by way of example only.

BRIEF DESCRIPTION OF THE DRAWINGS

FIG. 1 is a side elevational view of a fishing rod according to a first exemplary embodiment of the present invention;

DETAILED DESCRIPTION OF THE PREFERRED EMBODIMENTS

Figures 2A, 2B, 2C:
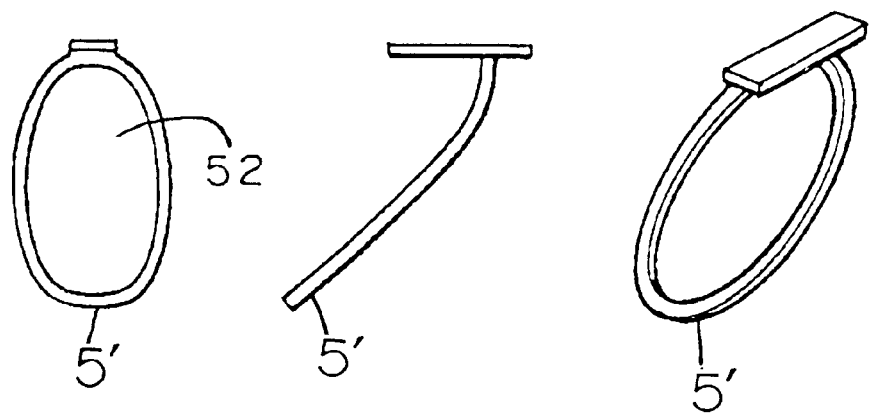
FIGS. 2A, 2B and 2C show fishing-line-guiding ring adapted to be used in the fishing rod according to the first exemplary embodiment of the present invention.

The fishing rod according to the first exemplary embodiment of the present invention shown in FIG. 1 comprises a grip handle 2 provided with a reel pedestal fixing device 1 on the lower side thereof, and a fishing rod member 3 having five pieces of fishing-line-guiding rings 5 fixedly secured to the lower surface thereof (one of which is denoted by reference numeral 5'), the fishing rod member 3 being connected with and fixedly secured to the leading end of the grip handle 2, the major axis of an ellipse of the fishing-line-guiding ring 5' located nearest to the grip handle 2 being inclined to the side of the grip handle 2 with respect to the direction at right angles to the lengthwise direction of the fishing rod. The remaining ringes 5 are arranged on the fishing rod member 3 with an axis substantially perpendicular to the axis of fishing rod member 3.

A spinning reel 6 is attached to the reel pedestal fixing device 1 on the lower side of the grip handle 2.

To prevent a fishing line 4 from contacting the the fishing rod member 3 even when the fishing line 4 is played out from the spinning reel 6 while it is being rotated, the fishing-line-guiding ring 5' should preferably have a lengthwise longer elliptical fishing-line-passing hole 52 as shown in FIGS. 2A, 2B and 2C, respectively. The fishing-line-guiding ring 5' having such lengthwise longer elliptical fishing-line-passing hole 52 is suitable for the purpose of preventing the fishing line 4 from contacting the fishing rod member 3, not only in case the spinning reel 6 is used, but also in case a reel 6' supported by twin bearings is used. FIG. 2A is a side elevational view of a fishing-line-guiding ring 5', FIG. 2B is a front view of the guiding ring 51, and FIG. 2C is a perspective view of the guiding ring 5'. Further, the major axis of an ellipse of the fishing-line-guiding ring 5' should preferably be inclined to the side of the grip handle 2 with respect to the direction at right angles to the lengthwise direction of the fishing rod so that the latter may be kept in custody by hanging it on a knob or on the user's waist belt in order to put on a fresh bait. While there is no specific limitation in the value of the angle of inclination of the guiding ring 5', stating in concrete manner, it is preferable that the major axis of an ellipse of the guiding ring 5' is inclined at an angle from about 5 degrees to about 80 degrees with respect to the direction at right angles to the lengthwise direction of the fishing rod member, and it is most suitable that the major axis of the ellipse of the guiding ring 5' is inclined at about 30 degrees under the same condition.

Figure 3:
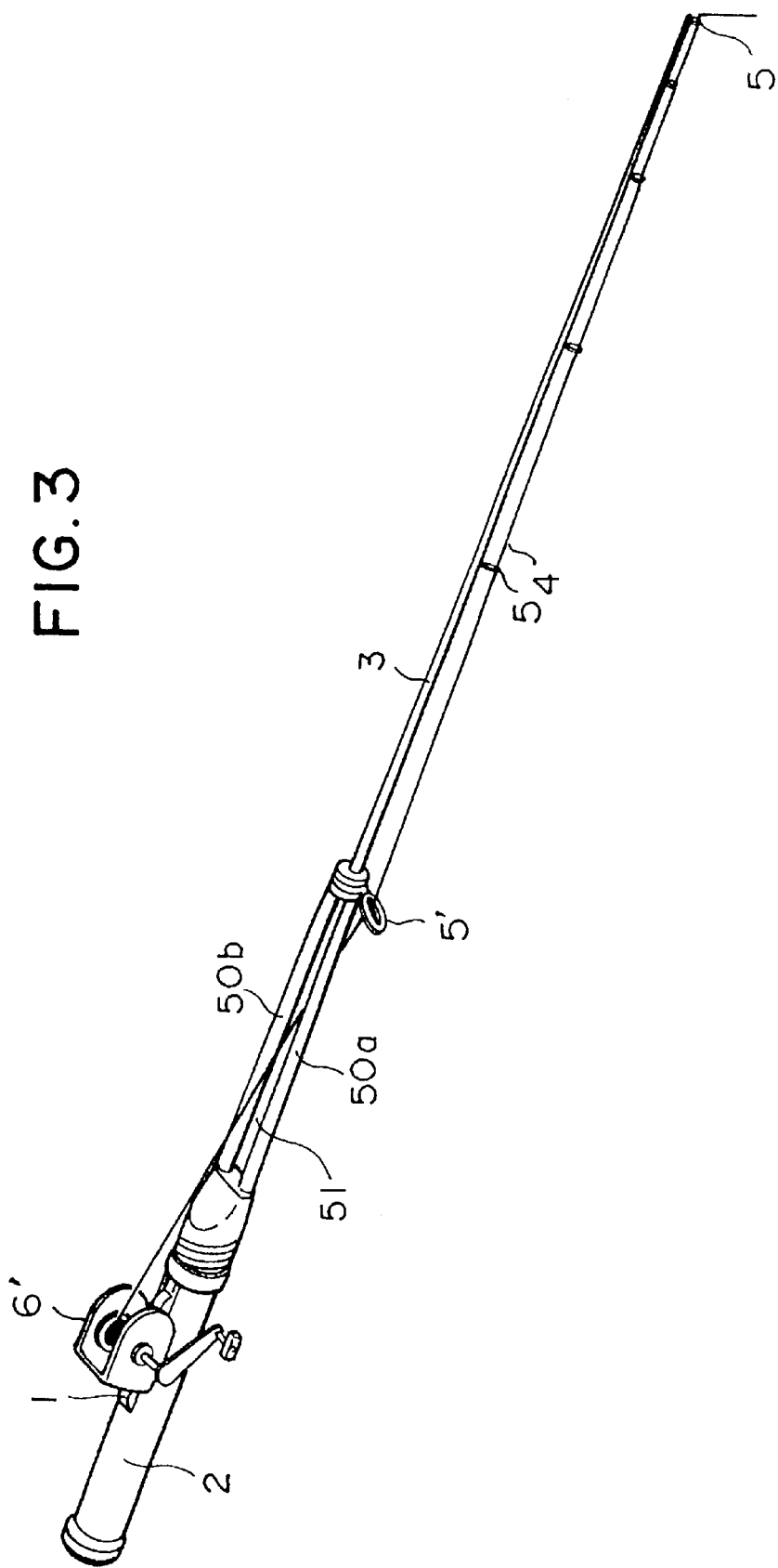
FIG. 3 is a perspective view of a fishing rod according to a second exemplary embodiment of the present invention.
Figure 4:
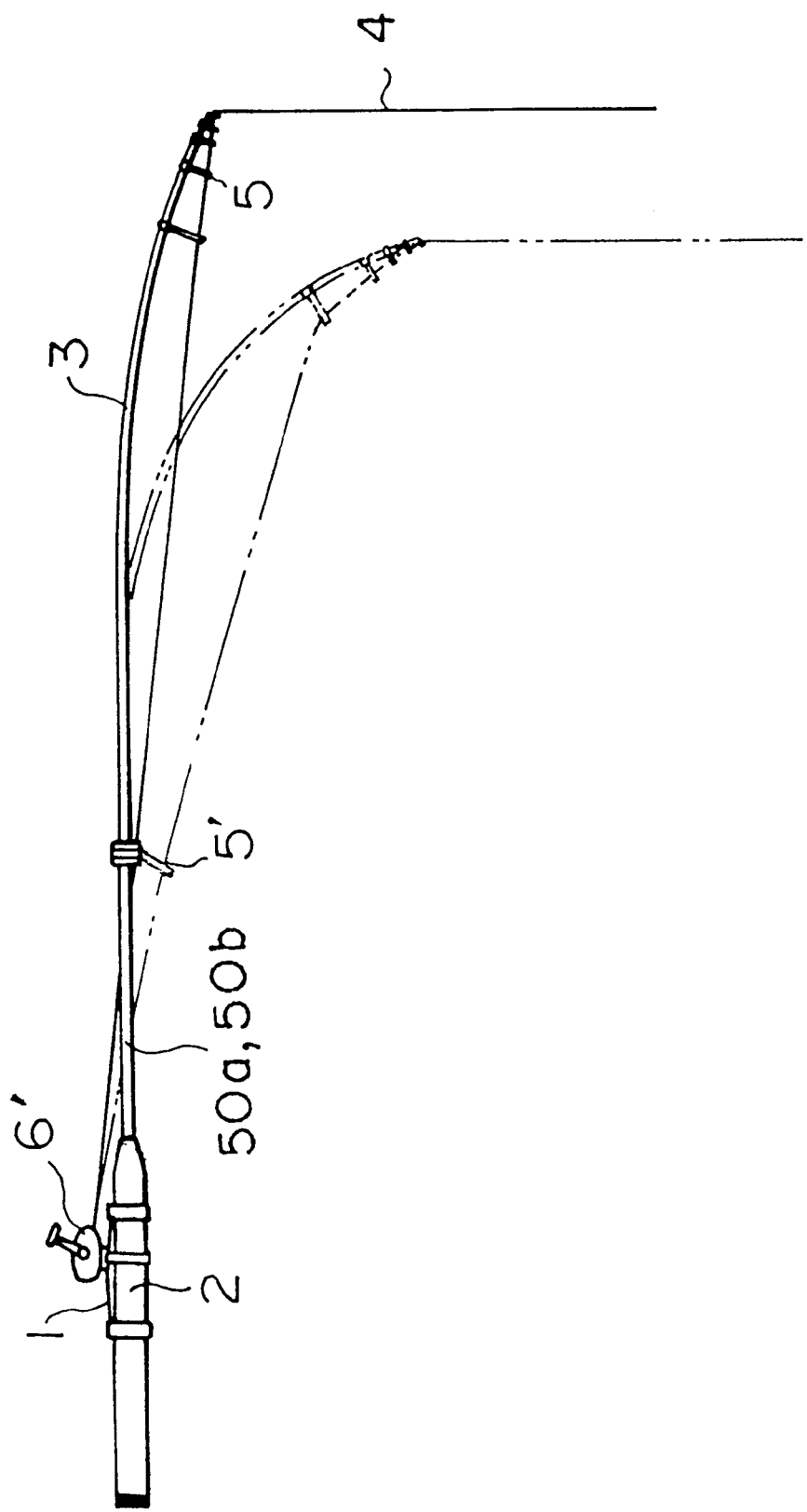
FIG. 4 is a side elevational view of the fishing rod of the second exemplary embodiment of the present invention in use.
Figures 5A, 5B, 5C:
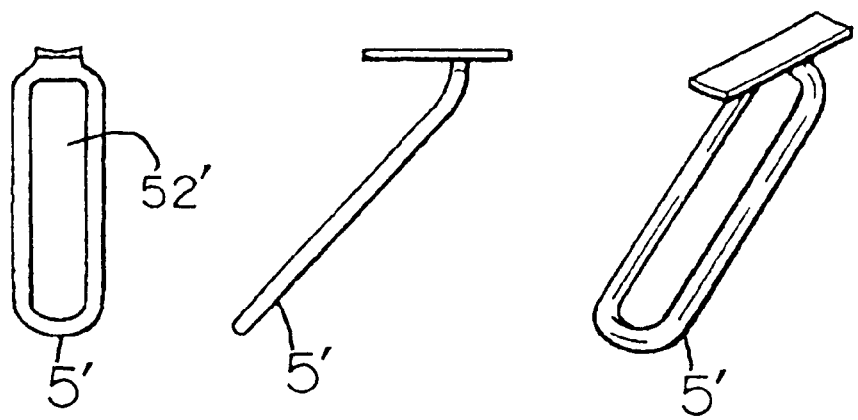
FIGS. 5A, 5B and 5C show fishing-line-guiding ring adapted for use in the fishing rod of the second exemplary embodiment of the present invention.

FIG. 3 is a perspective view of a fishing rod according to the second exemplary embodiment of the present invention. FIG. 4 is a side elevational view of the fishing rod shown in FIG. 3 which is in use. FIGS. 5A, 5B and 5C show fishing-line-guiding ring 5' adapted for use in the fishing rod of FIG. 3.

The fishing rod according to the second exemplary embodiment of the present invention as shown in FIG. 3 comprises a grip handle 2 provided with a reel pedestal fixing device 1 on the upper side thereof, and a fishing rod member 3 having six pieces of fishing-line-guiding rings 5 fixedly secured to the lower surface thereof (one of which is denoted by reference numeral 5'), the fishing rod member 3 being connected with and fixedly secured to the leading end of the grip handle 2 and extending through a space 51, the longer side of a rectangle of the fishing-line-guiding ring 5' located nearest to the grip handle 2, (space 51) being inclined to the side of the grip handle 2 with respect to the direction at right angles to the lengthwise direction of the fishing rod.

A reel 6' supported by twin bearings on both ends thereof is mounted on the reel pedestal fixing device 1 on the upper side of the grip handle 2. Five pieces of fishing-line-guiding rings 5 are fixedly secured to the lower surface of the fishing rod member 3. Stating in brief, the fishing line 4 extends through the reel 6' supported by twin bearings, which is mounted on the upper side of the grip handle, and through the space 51 and the fishing-line-guiding rings 5, 5' secured to the lower surface of the fishing rod member 3, and also through the fishing-line-guiding ring 5 secured to the leading end of the member 3.

To be brief, the fishing line 4 is moved through the space 51 formed in the intermediary axially central part of the fishing rod so as to prevent the fishing line 4 from contacting the fishing rod body.

This space 51 is formed by two parallel rods 50a, 50b which are spaced apart by a predetermined width, and whose one ends are connected with and fixedly secured to one end of the grip handle 2, and whose other ends are connected with and fixedly secured to one end of the fishing rod member 3 having a bigger size. The space 51 is elongated space in the axially lengthwise portion of the fishing rod. Stating in brief, this space 51 is formed lengthwise in the intermediary axially central portion of the fishing rod formed closer to the grip handle 2.

Six pieces of fishing-line-guiding rings 5 (one piece of which is denoted by reference numeral 5') are fixedly secured to the lower surface of the fishing rod member 3 in such a manner that they extend downwards at the position shown in FIG. 3. Since the fishing line 4 is swung up and down when there is a tug by a fish or by a weight, the above-mentioned fishing-line-passing hole 52 has a rectangular shape with its longitudinal axis inclined to the longitudinal axis of fishing rod member 3 as shown in FIGS. 5A, 5B and 5C, so that the fishing line 4 may be prevented from contacting the fishing-line-guiding ring 5' even when the fishing line 4 is played out (refer to FIG. 4). FIG. 5A is a side elevational view of the fishing-line-guiding ring 5', FIG. 5B is a front view of the guiding ring 5', and FIG. 5C is a perspective view of the guiding ring 5'.

The grip handle 2, the fishing rod member 3 and the parallel rods 50a, 50b may be made of any of the publicly known materials, such as glass fiber, carbon fiber, metals and plastics, besides bamboo and wood used generally as fishing rod materials. As for construction materials of the fishing-line-guiding ring 5', metals and plastic resins are suitable to hold the shape of the fishing-line-passing hole 52.

As described hereinabove, the fishing rod according to the present invention is convenient for storage, transportation and easiness for practical use, for instance, when baiting the hook. Further, according to the fishing rod of the present invention, since the fishing line is not permitted to move through the hollow portion of the fishing rod to contact the fishing rod body, it is possible to sensitively detect a strike transmitted on the fishing line to the user's hand. Further, since the fishing rod according to the present invention has a space formed by the two pieces of spaced apart parallel rods, the strength of the fishing rod is not lowered, and when there is a tug by a fish along the fishing line, fish can be hooked easily, utilizing the resiliency of the fishing rod.

The fishing rod according to the present invention is particularly suitable for fishing on board a ship using a reel.

It is to be understood that the foregoing description is merely illustrative of preferred embodiments of the present invention, and the scope of the invention is not to be limited thereto, but is to be determined by the scope of the appended claims.

What is claimed is:

1. A fishing rod for use with a reel comprising:

a grip handle having a reel pedestal fixing device to engage the reel disposed on an outer surface of the grip handle;

a fishing rod member having a plurality of fishing-line guiding rings fixed to an outer surface thereof opposite to the outer surface on which the reel pedestal fixing device is disposed;

said grip handle being fixed to said fishing rod member by at least a pair of rods spaced apart along a longitudinal axis of said fishing rod;

a first fishing-line-guiding ring of said plurality of fishing-line-guiding rings being nearest to said grip handle and inclined toward said grip handle;

wherein a fishing line wound on said reel and passing through a space between said pair of rods and said plurality of fishing-line-guiding rings can move freely in response to deflection of the fishing rod without the fishing line contacting said fishing rod member and said pair of rods.

2. A fishing rod according to claim 1, wherein said first fishing-line-guiding ring has a substantially rectangular opening through which the fishing line can pass.

3. A fishing rod according to claim 2, wherein a longitudinal axis of said substantially rectangular opening is inclined toward said grip handle.

4. A fishing rod according to claim 1, wherein said first fishing-line-guiding ring has an oval opening through which the fishing line can pass.

5. A fishing rod according to claim 4, wherein a longitudinal axis of said oval opening is inclined toward said grip handle.

6. A fishing rod according to claim 1, wherein the plurality of fishing-line guiding rings excepting said first fishing-line guiding ring each have an axis substantially perpendicular to the axis of said fishing rod member.

7. A fishing rod according to claim 1, wherein when the fishing rod is deflected, the fishing line does not contact said first fishing-line guiding ring.

* * * * *